United States Patent [19]
Miyao

[11] Patent Number: 5,792,551
[45] Date of Patent: Aug. 11, 1998

[54] LIGHT-WEIGHTED PREPREG AND GRIP MADE THEREFROM

[75] Inventor: Makizi Miyao, Saitama, Japan

[73] Assignees: Daiwa Seiko, Inc.; Tonen Corporation, both of Tokyo, Japan

[21] Appl. No.: 461,321

[22] Filed: Jun. 5, 1995

Related U.S. Application Data

[62] Division of Ser. No. 352,180, Dec. 5, 1994, abandoned.

[51] Int. Cl.$^6$ ............................................. B32B 3/00
[52] U.S. Cl. ................................ 428/304.4; 428/307.3; 428/308.4; 428/316.6; 428/319.3; 428/319.7
[58] Field of Search ................................ 428/218, 230, 428/308.4, 188, 304.4, 307.3, 316.6, 319.3, 319.7

[56] References Cited

U.S. PATENT DOCUMENTS

| | | |
|---|---|---|
| 3,547,162 | 12/1970 | Schaerer . |
| 3,712,659 | 1/1973 | Kneissl . |
| 4,053,676 | 10/1977 | Kaminstein . |
| 4,212,461 | 7/1980 | Cecka et al. . |
| 4,284,275 | 8/1981 | Fletcher . |
| 4,347,280 | 8/1982 | Lau et al. . |
| 4,373,718 | 2/1983 | Schmidt . |
| 5,055,340 | 10/1991 | Matsumura et al. . |

FOREIGN PATENT DOCUMENTS

| | | |
|---|---|---|
| 35-4625 | 3/1960 | Japan . |
| 58-1474 | 1/1983 | Japan . |
| 2124089 | 2/1984 | United Kingdom . |

*Primary Examiner*—Richard Weisberger
*Attorney, Agent, or Firm*—Longacre & White

[57] ABSTRACT

A light-weighted prepreg is composed of a sheet-shaped cork material of which opposite surfaces are coated with a resin and a fiber reinforced composite resin layer laminated on at least one surface of the sheet-shaped cork material. The light-weighted prepreg assures that a grip portion or a holder portion having a predetermined diameter is molded with minimized increase of weight while exhibiting excellent shock absorbing properties and gripping or holding comfortability at the time of practical use.

10 Claims, 4 Drawing Sheets

FIG. 11

| TEST ITEM | UNIT | G-40 | GS | GC | GD | GF | F-100 | REMARK |
|---|---|---|---|---|---|---|---|---|
| BULK DENSITY | g/cm² | 0.26 | 0.24 | 0.2 | 0.16 | 0.21 | 0.23 | WATER SUBSTITUTION METHOD |
| TENSILE STRENGTH | Kg/cm² | 10 OR MORE | 10 OR MORE | 7 OR MORE | 5 OR MORE | 7 OR MORE | 6 OR MORE | SHOPPER TENSILE TESTING MACHINE |
| COMPRESSION-ABILITY | % | 10 ~ 20 | 15 ~ 25 | 20 ~ 30 | 25 ~ 35 | 20 ~ 30 | 20 ~ 30 | COMPRESSION TEST CONDUCTED WITH TESTPIECES EACH HAVING A DIMENSION OF 28.7mm IN DIAMETER FOR ONE MINUTE UNDER CONDITIONS OF PRELOAD OF 0.45Kg AND MAIN LOAD OF 45Kg |
| RECOVERY RATE | % | 75 OR MORE | 75 OR MORE | 75 OR MORE | 75 OR MORE | 75 OR MORE | 75 OR MORE | PERCENTAGE OF RECOVERY RESTORED FOR ONE MINUTE AFTER MAIN LOAD IS REMOVED |
| BENDING PROPERTIES | | ACCEPTABLE | ACCEPTABLE | ACCEPTABLE | ACCEPTABLE | ACCEPTABLE | ACCEPTABLE | FLAWS SUCH AS CRACKING, BREAKAGE, CUT OR THE LIKE SHOULD NOT BE RECOGNIZED ON THE TESTPIECE BENT TO A DIAMETER AS LARGE AS FIVE TIMES OF THE THICKNESS OF THE TESTPIECE |

NOTE : TESTING METHOD PRACTICED IN CONFORMITY WITH ASTM F104-68T

LIGHT-WEIGHTED PREPREG AND GRIP MADE THEREFROM

This is a divisional of application Ser. No. 08/352,180, filed Dec. 5, 1994, now abandoned.

BACKGROUND OF THE INVENTION

The present invention relates to a light-weighted prepreg and/or a grip made therefrom, which is light in weight and exhibits excellent shock absorbing properties wherein the prepreg and/or the grip is preferably employable not only for a grip portion on a sport/leisure article such as a golf club shaft, a fishing rod, a tennis racket, a handle bar of a bicycle or the like but also for a holder portion on a various kind of machining tool such as a hammer or the like.

In recent years, prepregs each having a various kind of reinforcement fibers such as carbon fibers or the like employed therefor have been widely put in practical use in various technical fields. For example, when sport/leisure articles such as golf club shafts or the like are produced, many prepregs are practically utilized for the reasons of light weight and high mechanical strength thereof, and products of sport/leisure articles each having a prepreg employed therefor exhibit very good performances.

With such a golf club shaft as produced in that way, the diameter of the golf club shaft can sufficiently be reduced without any sacrifice of the mechanical strength thereof but a grip portion of the golf club shaft is unavoidably dimensioned to have a predetermined diameter in terms of convenience of practical use.

In the circumstances as mentioned above, many proposals have been hitherto made. One of them is such that a band of leather is repeatedly wound about a grip portion of a golf club shaft 100 molded of a fiber reinforced synthetic resin until the diameter of the grip portion is increased to reach a predetermined outer diameter, and another one is such that a grip 102 molded of a synthetic rubber or the like is fitted onto the grip portion of the golf club shaft 100.

With the conventional grip constructed in the above-described manner, the specific gravity of a leather or a synthetic rubber is large compared with that of a fiber reinforced synthetic resin employed for the golf club shaft. This leads to the undesirable result that the weight of a product of sport/leisure article is unavoidably increased. Further, many requests have been raised from users for substantially improving properties of gripping comfortability (ball hitting feeling) at the time of playing with the grip portion of a golf club shaft or shock absorbing properties of a hammer or the like to be evaluated in terms of striking comfortability of a holder portion thereof.

In official gazettes of Japanese Utility Model Publication NO. 35-4625 and Japanese Patent Laid-Open Publication NO. 58-1474, another measure is taken such that the grip includes an inside layer molded of a light and flexible material, e.g. a cork or a foamed polyurethane and disposed inside of a grip member made of a leather, a rubber or the like, in order to reduce the whole weight of an assembly of the grip and the inside layer. However, as the grip assembly thus constructed is repeatedly used for a long time, there arises a malfunction that the flexibility of the grip assembly is gradually reduced, and moreover, e.g., certain locations on the grip assembly having golf player's fingers placed thereon is increasingly depressed without any possibility that they are restored to the initial state.

To satisfy these requests and to solve these deficiency in the prior proposals, the inventor conducted many kinds of research and experimental activities. As a result derived from the research and experimental activities, the inventor found out that a grip portion or a holder portion having a desired diameter could be molded with minimized increase of its weight by employing a light-weighted prepreg having a sheet-shaped flexible cork laminated with a fiber reinforced synthetic resin layer and that the grip portion or the holder portion produced by using the prepreg exhibited excellent gripping or striking comfortability, i.e., excellent shock absorbing properties at the time of practical use.

The present invention has been made based on the aforementioned knowledge.

Therefore, an object of the present invention is to provide a light-weighted prepreg which assures that a grip portion or a holder portion having a predetermined diameter can be molded with minimized increase of weight thereof while exhibiting excellent shock absorbing properties and gripping or holding comfortability at the time of practical use.

Another object or the present invention resides in providing a grip of which weight is substantially reduced and which assures that each user can enjoy excellent gripping comfortability with the grip without any possibility that certain depressed locations having player's fingers placed thereon are not restored to the initial state after the grip is repeatedly used for a long time.

SUMMARY OF THE INVENTION

The above-noted and other objects can be accomplished by a light-weighted prepreg constructed according to the present invention. A characterizing feature of the present invention consists in that the light-weighted prepreg is composed of a sheet-shaped flexible cork material and a fiber reinforced composite resin layer laminated on at least one surface of the sheet-shaped cork material.

The present invention further provides a grip for a golf club shaft, a tennis racket, a fishing rod or the like, wherein the grip is characterized in that a hard elastic material layer molded of a hard synthetic resin is interposed between adjacent flexible material layers each molded of a flexible material. When each user grasps the grip, each flexible material layer is deformed corresponding to an intensity of external force applied thereto, resulting in the user feeling excellent gripping comfortability with the grip. Subsequently, when the external force applied to the grip disappears, each hard elastic material layer serves to restore the associated flexible material layers to the initial state. Thus, there does not arise a malfunction that the depressed parts on each flexible material layer are kept unchanged.

BRIEF DESCRIPTION OF THE DRAWINGS

In the accompanying drawings:

FIG. 11 (Table 1) shows physical properties of cork sheets.

DETAILED DESCRIPTION OF THE PREFERRED EMBODIMENTS

The present invention will now be described in detail hereinafter with reference to the accompanying drawings which illustrates preferred embodiments thereof.

Figure 1:
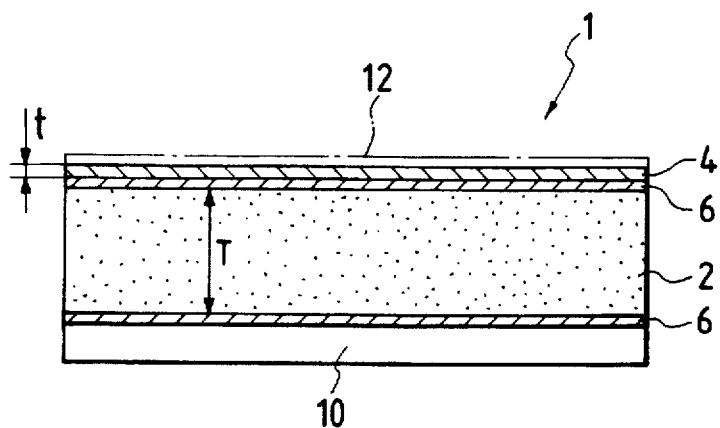
FIG. 1 is a sectional view of a light-weighted prepreg constructed according to an embodiment of the present invention.

For example, as shown in FIG. 1, a light-weighted prepreg 1 of the present invention includes a sheet-shaped flexible cork material 2 and a fiber reinforced composite resin layer 4 laminated on at least one surface of the sheet-shaped flexible cork material 2. To improve the adhesiveness of the sheet-shaped cork material 2 to the fiber reinforced composite resin layer 4, a resin 6 is applied to a joint surface between the sheet-shaped flexible cork material 2 and the fiber reinforced composite resin layer 4. In addition, to optimize the connectability of the light-weighted prepreg 1 to other member to be adhesively connected to the light-weighted prepreg 1, a resin 6 is likewise applied to the opposite surfaces of the sheet-shaped flexible cork material 2. As will be described in detail later, it is preferable that the same resin as the matrix resin used for the fiber reinforced composite resin layer 4 is employed for the resin 6 applied to the opposite surfaces or the sheet-shaped flexible cork material 2. For the purpose of store the light-weighted prepreg 1, the lower surface of the sheet-shaped flexible cork material 2 is held on a base material 10 which may be prepared in the form of a releasable paper, and the upper surface of the fiber reinforced composite resin layer 4 is covered with a cover film 12 such as a polyethylene film or the like.

Specifically, any type of cork available on the commercial basis can be employed for the sheet-shaped flexible cork material 2. The sheet-shaped flexible cork material 2 is usually dimensioned to have a thickness T ranging from 0.2 to 2 mm. If the thickness T of the sheet-shaped flexible cork material 2 is set to 0.2 mm or less, its flexibility is increased but a problem arises in respect of shock absorbing properties of the sheet-shaped flexible cork material 2. On the contrary, if the thickness T of the sheet-shaped flexible cork material 2 exceeds 2 mm, a problem arises in respect of the flexibility of the sheet-shaped flexible cork material 2. For example, cork sheets produced by Nagayanagi Kogyo K. K. (commercially sold under trade names G-40, GS, GC, GD, GF, and F-100) are preferably employable for the sheet-shaped flexible cork material 2. Physical properties of the cork sheets are as shown in Table 1.

Although a quantity of the resin 6 to be applied to the opposite surfaces of the sheet-shaped flexible cork material 2 varies depending on the properties of the sheet-shaped flexible cork material 2, it is usually set to 18 to 60 g/m$^2$, and the resin 6 applied thereto is dimensioned to have a thickness ranging from about 15 to 50 μm.

Next, description will be made below with respect to the fiber reinforced composite resin layer 4. According to the present invention, the fiber reinforced composite resin layer 4 can be constructed in the same manner as the conventional one. Specifically, the fiber reinforced composite resin layer 4 can be composed of a certain type of reinforcement fiber and a matrix resin.

Among a plurality of reinforcement fibers comprising an inorganic fiber such as a carbon fiber, a boron fiber, a glass fiber, an alumina fiber, a silicon carbide fiber, a silicon nitride fiber or the like, an organic fiber such as an aramid fiber, a polyarylate fiber, a polyethylene fiber or the like and a metallic fiber such as a titanium fiber, an amorphous fiber, a stainless steel fiber or the like, one of them can singly be employed. Otherwise, two or more selected from the aforementioned reinforcement fibers can be employed in a hybrid fashion while they are well mixed with each other. In addition, each reinforcement fiber can be used in the form of a unidirectional fiber. Alternatively it may be used in the form of a cloth. Otherwise, it may be used in the form of a mat.

A thermosetting resin such as an epoxy resin, an unsaturated polyester resin, a polyurethane resin, a diarylphthalate resin, a phenol resin or the like can be employed for the matrix resin. In addition, a certain quantity of hardening agent and other additive, e.g., a flexibility adding agent is added to the thermosetting matrix resin so as to allow the latter to be hardened at a temperature ranging from 50° to 200° C.

A few preferably employable examples will be noted with respect to the thermosetting resin in the following.

It is preferable that an epoxy resin is employed as a matrix resin. One kind or plural kinds of epoxy resins selected from a group of epoxy resins comprising (1) a glycydyl ether based epoxy resin (bisphenol A, F, S based epoxy resin, novolak based epoxy resin, brominated bisphenol A based epoxy resin), (2) a cyclic aliphatic epoxy resin, (3) a glycydyl meter based epoxy resin, (4) a glycydyl amine based epoxy resin, (5) a heterocyclic epoxy resin and other various kinds of epoxy resins are employed as an epoxy resin usable for the matrix rosin. Especially, the bisphenol A, F, S glycydyl amine based epoxy resin is preferably employable for the same purpose. An amine based hardening agent, e.g., dicyan-diamide (DICY), diamino-diphenol-sulfone (DDS), diamino-diphenyl-methane (DDM) or the like and a acidanhydride based hardening agent, e.g., hexahydrophthalic-anhydride (HHPA), methyl-hexahydrophthalic anhydride (MHHPA) or the like are employable as a hardening agent. Especially, an amine based hardening agent is preferably employable for the same purpose.

According to the present invention, a ratio of content of the reinforcement fiber to that of the matrix resin for the fiber reinforced composite resin layer 4 can arbitrarily be determined. Usually, the ratio of content of the reinforcement fiber to that of the matrix resin is set to (40 to 80):(60 to 20) in terms of weight percentages. In addition, a thickness t of the fiber reinforced composite resin layer 4 is determined depending to a diameter of the reinforcement fiber used for the fiber reinforced composite resin layer 4. Usually, it is set to about 60 to 300 μm.

The light-weighted prepreg 1 can be produced by employing any type of method. In general, it is preferable that the method is practiced by way of steps of impregnate the reinforcement fibers with the matrix resin to form a fiber reinforcement composite resin 4 and then allow the fiber reinforced composite resin layer 4 to adhere to one surface of the sheet-shaped flexible cork material 2 of which opposite surfaces are coated with the same rosin 6 as the matrix resin constituting the fiber reinforced composite resin layer 4 while the fiber reinforced composite resin layer 4 is forcibly thrusted against the sheet-shaped flexible cork material 2 by actuating a certain tool, e.g., a roller with an operator's hand.

Figure 2:
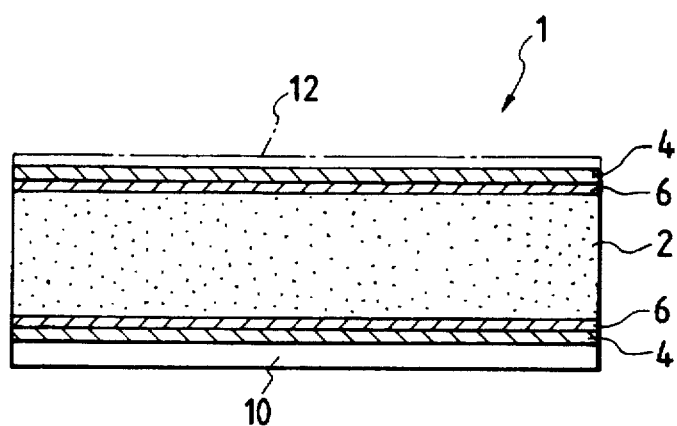
FIG. 2 is a sectional view of a light-weighted prepreg constructed according to another embodiment of the present invention.

The present invention has been described above with respect to the embodiment wherein the fiber reinforced composite resin layer 4 adheres to one surface of the sheet-shaped flexible cork material 2 to produce a light-weighted prepreg 1. Alternatively, as shown in FIG. 2, the light-weighted prepreg 1 may be constituted such that fiber reinforced composite resin layers 4 adhere to the opposite surfaces of the sheet-shaped flexible cork material 2 while a resin 6 serving as an adhesive is interposed between each sheet-shaped flexible cork material 2 and the corresponding fiber reinforced composite resin layer 4.

Next, a typical example of producing the light-weighted prepreg 1 according to the present invention will be described below.

EXAMPLE 1

A light-weighted prepreg constructed as illustrated in FIG. 1 was produced. Specifically, a cork sheet produced by Nagayanagi Kogyo K. K. (commercially sold under a trade name of "GC") with a thickness T of 0.9 mm was employed as a raw material for a sheet-shaped flexible cork material 2, and an epoxy resin 6 containing a hardening agent was then uniformly applied to the opposite surfaces of the sheet-shaped flexible cork material 2 at a rate of 40 g/m².

In this example, to form a fiber reinforced composite resin layer 4, reinforcement fibers composed of PAN based carbon fibers (produced and sold by Toray K. K. under a trade name of "T-300") each having a diameter of 7.0 μm were unidirectionally arranged and they were then impregnated with a matrix resin composed of an epoxy resin containing a hardening layer. At this time, the matrix resin was substantially same to the resin 6 employed for a sheet-shaped flexible cork material 2. A content of the matrix resin was set to 35% by weight and a thickness t of the same was set to 75 μm.

The carbon fiber reinforced composite resin layer 4 was caused to adhere to one surface of the sheet-shaped flexible cork material 2 having the resin 6 applied thereto by forcibly thrusting the carbon fiber reinforced composite resin layer 4 against one surface of the sheet-shaped flexible cork material 2 by actuating a roller with an operator's hand while the sheet-shaped flexible cork material 2 was held on a release paper 10, whereby a light-weighted prepreg 1 was produced according to the present invention.

Figure 3:
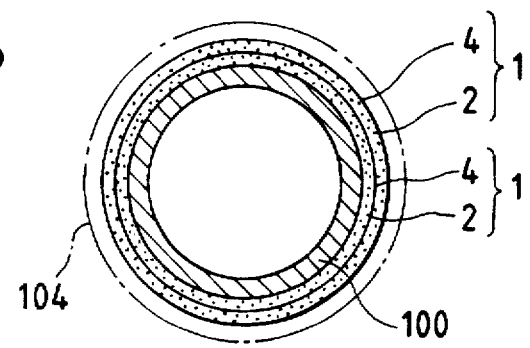
FIG. 3 is a cross-sectional view of a grip portion for a golf club shaft wherein the grip portion is produced using light-weighted prepregs each constructed according to an embodiment of the present invention.
Figure 4:
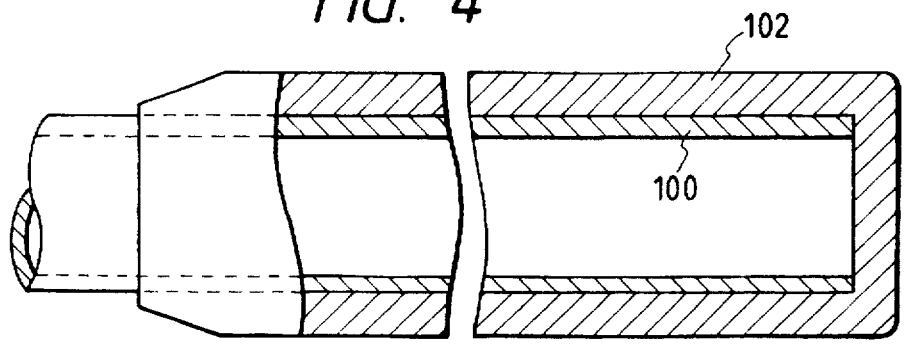
FIG. 4 is a sectional view of a conventional grip portion for a golf club shaft.

Next, as shown in FIG. 3, two sheets of light-weighted prepregs 1 were double wound about a golf club shaft 100 molded of a fiber reinforced composite rosin with an outer diameter of 15 mm to form a grip portion, and thereafter, an intermediate product of grip portion was tightened by winding a polyethylene tape 104 thereabout. On completion of the tightening operation, an assembly of the grip portion and the tightening tape was placed in a hardening furnace in which the grip portion was hardened. At this time, the grip portion had an outer diameter of 16.75 μm.

After the grip portion was hardened, a band of leather was wound about the grip portion by a small thickness so as to serve as a slippage preventive member, whereby a final product of grip portion was obtained.

It was confirmed that the grip portion for a golf club shaft produced based on the light-weighted prepregs 1 of the present invention had few increase of weight and exhibited excellent gripping comfortability and shock absorbing properties at the time of practical use.

As is apparent from the above description, since the light-weighted prepreg of the present invention includes a sheet-shaped flexible cork material, various kinds of grip portions or holder portions each having a comparatively large diameter can be produced with minimized increase of weight, and moreover, each of the grip portions or the holder portions exhibited excellent shock absorbing properties and gripping or holding comfortability at the time of practical use.

Figure 5:
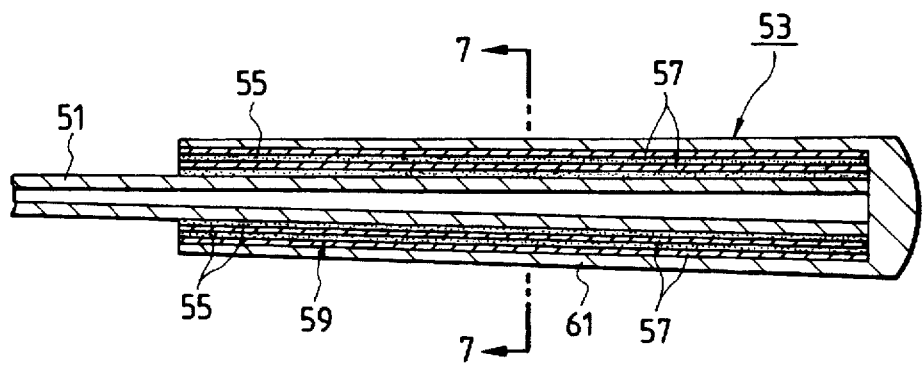
FIG. 5 is a sectional view of a golf club shaft including a grip constructed according to another embodiment of the present invention.

FIG. 5 shows by way of sectional view the structure of a golf club shaft including a grip constructed an another embodiment of the present invention. In the drawing, reference numeral 51 designates a cylindrical main body of the golf club shaft which is molded of a synthetic resin, e.g., a fiber reinforced plastic material containing fibers each having a high tensile strength. As is apparent from the drawing, the shaft main body 51 is dimensioned to have a diameter which is gradually reduced from the fitting portion for a grip 53 to the fitting portion for a head (not shown) at the foremost end thereof.

Figure 6:
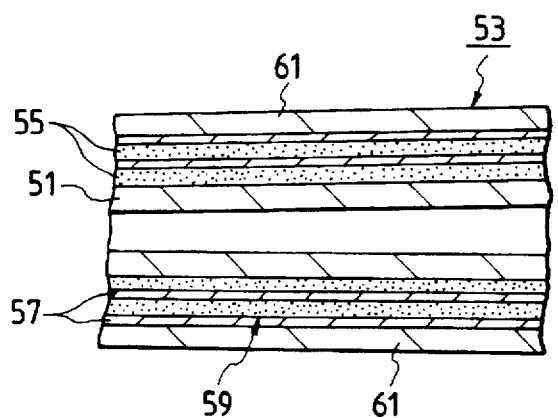
FIG. 6 is a fragmentary enlarged sectional view of the golf club shaft shown in FIG. 5.
Figure 7:
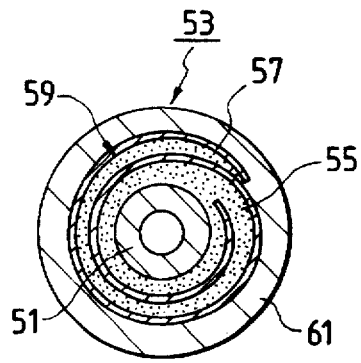
FIG. 7 is a cross-sectional view of the golf club shaft taken along line 7—7 In FIG. 5.

As shown in FIG. 6 and FIG. 7, the grip 53 is composed of an inside layer 59 including a flexible material layer 55 and a hard elastic material layer or fiber reinforced composite resin layer 57 both of which are spirally wound together about the shaft main body 51 while the hard elastic layer 57 is sandwiched between the adjacent flexible material layers 55. In addition, the grip 53 includes a grip sheath 61 molded of a rubber and fitted onto the inside layer 59.

The flexible material Layer 55 is molded of a light and flexible material such as a cork, a foamed polyurethane resin or the like. Thus, when a player grasps the grip 53 with his hands, the grip 53 is elastically deformed corresponding to an intensity of gripping force applied to the grip 53, causing him to feel good gripping comfortability.

On the other hand, the hard elastic material layer 57 is made of a hardened prepreg sheet having carbon fibers impregnated with a matrix such as an epoxy resin or the like. When any exterior force is not applied to the grip 53, the hard elastic material layer 57 serves to allow the flexible material layer 55 to be restored to the initial state while preventing the flexible material layer 55 from being physically degraded.

In the embodiment, the grip 53 is constructed in the above-described manner and practically produced in the following manner.

First, a sheet of prepreg constituting the hard elastic material layer 57 is lined with a sheet of flexible material layer having a cork or a foamed polyurethane resin impregnated with a thermosetting resin, and an assembly i.e. a light-weighted prepreg made up of the prepreg sheet and the flexible material layer sheet is wound about the shaft main body 51 by several turns.

After an intermediate product is tightened by winding a tightening tape thereabout, it is subjected to thermosetting. On completion of the thermosetting, the Lightening tape i peeled away from the intermediate product, whereby the inside layer 59 in made integral with the shaft main body 51 while the hard elastic layer 57 is sandwiched between the adjacent flexible material layers 55.

Thereafter, a cylindrical grip sheath 61 molded of a rubber in the same manner as the conventional grip is fitted onto the inside layer 59. Consequently, the grip 53 has been produced according to the embodiment of the present invention.

It has been confirmed by a player that the grip 53 produced in that way is deformed corresponding to an intensity of impact force applied to the grip 53 so that the player enjoys good gripping comfortability with the grip.

When any exterior force is not applied to the grip 53, the hard elastic material layer 57 serves to restore the flexible material layer 55 to the initial state while preventing the flexible material layer 55 from being physically degraded.

As is apparent from the above description, according to the embodiment of the present invention, since the grip sheath 61 is lined with the inside layer 59 and the grip 53 is assembled with a small weight, each player can enjoy excellent gripping comfortability with the grip. In addition, since there does not arise a malfunction that as the grip 53 is repeatedly used for a long time, certain locations on the grip 53 having player's fingers placed thereon are depressed without any possibility that they are restored to the initial state. Thus, the grip 53 can maintain its original properties for a long time while keeping good appearance thereof unchanged.

Figure 8:
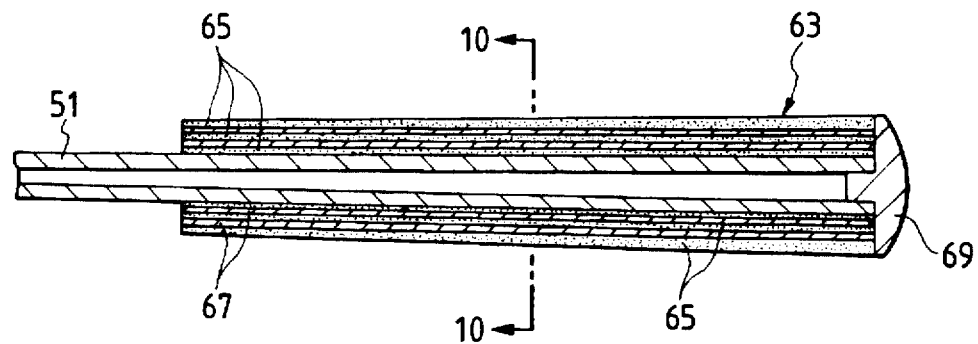
FIG. 8 is a sectional view of a golf club shaft including a grip constructed according to yet another embodiment of the present invention.
Figure 9:
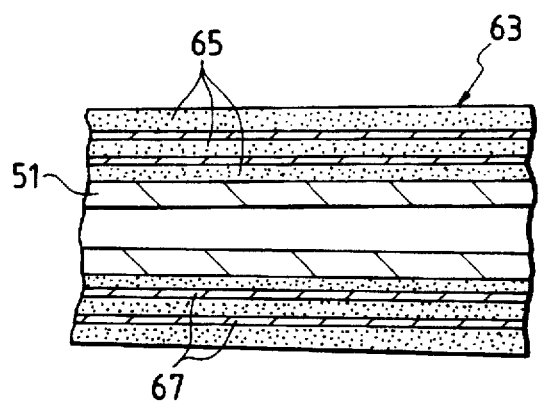
FIG. 9 is a fragmentary enlarged sectional view of the golf club shaft shown in FIG. 8.
Figure 10:
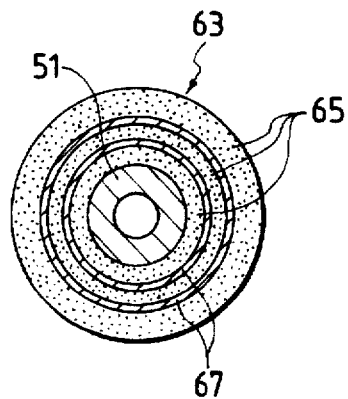
FIG. 10 is a cross-sectional view of the golf club shaft taken along line 10—10 in FIG. 8.

Next, FIG. 8 shows by way of sectional view the structure of a golf club shaft including a grip constructed according to yet another embodiment of the present invention. In the drawing, reference numeral 63 designates a grip which is fitted to the rear end part of a main body 51 of the golf club shaft. As shown in FIGS. 9 and 10, the grip 63 is constructed in such a laminated structure that two hard elastic material layers 67 are separately arranged between three flexible material layers 65, and a cap 69 is fitted into the rear end of the shaft main body 51.

Each of the flexible material layers 65 is molded of a flexible material such as a cork, a foamed polyurethane resin or the like. Thus, when a player grasps the grip 63 with his hands, the flexible material layers 65 are adequately deformed, causing him to feel good griping comfortability with the grip 63.

On the other hand, each of the hard elastic material layer 67 is molded of a fiber reinforced synthetic resin containing carbon fibers or the like. When any exterior force is not applied to the grip 63, the hard elastic material layers 67 serve to restore the flexible material layers 65 to the initial state in the same manner as a single hard elastic material layer 57 in the former embodiment while preventing the flexible material layers 65 from being physically degraded.

When the grip 63 constructed in the above-described manner according to the embodiment of the present invention is produced, first, three flexible material layers 65 each formed of a cork, a foamed polyurethane resin or the like and two hard elastic material layers 65 each molded of a fiber reinforced synthetic resin are alternately wound about the outer peripheral surface of the shaft main body 51 at the rear end part of the latter using an adhesive while rotating the shaft main body 51 so as to build the laminated structure as shown in the drawings, and thereafter, the cap 69 is fitted into the rear end of the shaft main body 51. In place of using the adhesive, the corks the foamed polyurethane resin or the like may be preliminary impregnated with the same resin as a matrix resin of the hard elastic material layer.

With the grip 63 constructed in the above-described manner according to the embodiment of the present invention, when a player grasps the grip 63 with his hands, the flexible material layers 65 are elastically deformed, and subsequently, when the exterior force given by the player disappears, the hard elastic material layers 67 serve to allow the flexible material layers 65 to be restored to the initial state while preventing the flexible material layers 65 from being physically deformed.

Also, when a player grasps the grip 63 with his hands, he feels good gripping comfortability and light weight with the grip 63 in the same manner as the former embodiment. In addition, there does no arise a malfunction that after the grip 63 is repeatedly used for a long time, certain locations on the grip 63 having his fingers placed thereon are depressed without any possibility that they are restored to the initial state. Thus, the grip 63 can maintain its original properties for a long time while keeping good appearance thereof unchange.

In the embodiment shown in FIG. 8, as the shaft main body 51 is rotated, the three flexible material layers 65 each molded of a flexible material such as a cork, a foamed polyurethane resin or the like and the two hard elastic material layers 67 each molded of a fiber reinforced synthetic resin are alternately wound about the outer peripheral surface of the shaft main body 51 at the rear end part of the latter as mentioned above. Alternatively, five conically extending cylindrical members corresponding to the three flexible material layers 65 and the two hard elastic material layers 67 may preliminarily be prepared such that they are successively fitted onto the shaft main body 51 from the foremost end side of the latter so as to build the substantially same laminated structure as that in the embodiment of the present invention with the aid of an adhesive.

Also with such construction as modified in that way, the same advantageous effects as those in each of the embodiments of the present invention are obtainable.

Although the embodiments of the present invention has been described above with respect to the case that the present invention is applied to a grip for a golf club shaft. However, the present invention should not be limited only to the grip for a golf club shaft. Alternatively, the present invention may equally be applied to a grip for a tennis racket, a fishing rod or the like without any loss of the same advantageous effects as mentioned above.

As is apparent from the above description, with a grip constructed according to the present invention, each user can enjoy excellent gripping comfortability and light weight, and moreover, there does not arise a malfunction that after it is repeatedly used for long time, certain locations on the grip having user's finger placed thereon are depressed without any possibility that they are restored to the initial state. Consequently, the grip can maintain its original properties for a long time while keeping good appearance thereof unchanged.

What is claimed is:

1. A grip which is formed on an article and which is adapted to be grasped by a person, comprising at least one first layer molded of a fiber reinforced synthetic resin interposed between two adjacent second sheet-shaped layers each formed of a flexible material having a flexibility greater than said fiber reinforced synthetic resin so that said second sheet-shaped layers can be compressed from an initial state when said person grips said grip and where said fiber reinforced synthetic resin serves to substantially restore said second layers to said initial state, wherein said flexible layer is chosen from a group consisting of at least one of cork and foamed polyurethane resin.

2. The grip according to claim 1, wherein a prepreg sheet is spirally wound onto said article in an overlapping manner, said prepreg sheet including a flexible material sheet having first and second opposite surfaces, and a fiber reinforced composite resin layer laminated on at least one of said opposite surfaces, said fiber reinforced composite resin layer defining a first portion and a second portion, such that said first portion of said fiber reinforced composite resin layer forms said first layer and said flexible material sheet forms each of said second layers as said prepreg sheet overlaps itself, and wherein said prepreg sheet is thermally set on said article.

3. The grip according to claim 2, wherein the second portion of said fiber reinforced composite resin layer forms an outer periphery onto which a cylindrical sheath molded of a rubber is fitted.

4. The grip according to claim 1, wherein said grip is formed using first and second prepreg sheets, each prepreg sheet including a flexible material sheet having opposite surfaces, and a fiber reinforced composite resin layer laminated on at least one of said opposite surfaces, such that said first prepreg sheet is wound onto said article and said second prepreg sheet is wound thereon so that said fiber reinforced composite resin layer of said first prepreg sheet forms said first layer and said flexible material sheets of said first and second prepreg sheets respectively form said second layers, and said wound first and second prepreg sheets are thermally set onto said article.

5. The grip according to claim 4, wherein said fiber reinforced composite resin layer of said second prepreg sheet forms an outer periphery onto which a band of leather is wound.

6. The grip according to claim 1, wherein a first flexible material sheet is wound onto said article to form one of said second layers, a fiber reinforced composite resin sheet is wound onto said first flexible material sheet to form said at least one first layer, and a second flexible material sheet is wound onto said fiber reinforced composite resin sheet to form the other of said second layers.

7. The grip according to claim 1, wherein said grip has an outermost layer formed by one of a rubber cylindrical sheath and a wound leather band.

8. The grip according to claim 1, wherein a single laminated sheet circumscribes said article at least twice, said laminated sheet being formed of said at least one first layer formed of fiber reinforced synthetic resin and at least one of said adjacent second layers formed of said flexible material.

9. The grip according to claim 1, wherein a plurality of laminated sheets circumscribe said article, each of said laminated sheets being formed of said at least one first layer molded of said fiber reinforced synthetic resin and at least one of said adjacent second layers formed of said flexible material.

10. The grip according to claim 1, wherein said grip is formed by alternatively winding a fiber reinforced synthetic resin sheet and a flexible material sheet around said article.

* * * * *